(12) United States Patent
Wyss et al.

(10) Patent No.: US 11,895,061 B2
(45) Date of Patent: Feb. 6, 2024

(54) DYNAMIC PRIORITIZATION OF COLLABORATION BETWEEN HUMAN AND VIRTUAL AGENTS

(71) Applicant: Genesys Cloud Services, Inc., Menlo Park, CA (US)

(72) Inventors: Felix Immanuel Wyss, Indianapolis, IN (US); Matthew Jahns, Indianapolis, IN (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 17/348,225

(22) Filed: Jun. 15, 2021

(65) Prior Publication Data
US 2022/0400091 A1   Dec. 15, 2022

(51) Int. Cl.
| | |
|---|---|
| H04L 12/24 | (2006.01) |
| H04L 12/58 | (2006.01) |
| H04L 29/06 | (2006.01) |
| G06F 40/35 | (2020.01) |
| G06F 40/30 | (2020.01) |
| H04M 3/523 | (2006.01) |
| H04L 51/02 | (2022.01) |
| H04L 65/40 | (2022.01) |
| H04L 65/1083 | (2022.01) |
| H04L 65/80 | (2022.01) |

(52) U.S. Cl.
CPC ......... *H04L 51/02* (2013.01); *H04L 65/1083* (2013.01); *H04L 65/40* (2013.01); *H04L 65/80* (2013.01)

(58) Field of Classification Search
CPC ..... H04L 51/02; H04L 65/1083; H04L 65/40; H04L 65/80
See application file for complete search history.

(56) References Cited

U.S. PATENT DOCUMENTS

| | | | | |
|---|---|---|---|---|
| 9,514,133 | B1* | 12/2016 | Kursun | G06F 16/285 |
| 10,353,726 | B2* | 7/2019 | Duan | G06F 9/45533 |
| 10,586,175 | B2* | 3/2020 | McCord | G06F 40/205 |
| 10,897,537 | B1* | 1/2021 | Filbin | H04M 3/5116 |
| 11,115,353 | B1* | 9/2021 | Crowley | G06F 40/284 |
| 11,200,581 | B2* | 12/2021 | Williams | H04L 67/566 |
| 11,245,646 | B1* | 2/2022 | Koukoumidis | G06F 3/017 |
| 11,245,793 | B2* | 2/2022 | McGann | G06Q 30/01 |

(Continued)

OTHER PUBLICATIONS

International Search Report and Written Opinion of the International Searching Authority; ISA/US; International Application No. PCT/US2022/033248; dated Jul. 26, 2022; 9 pages.

(Continued)

*Primary Examiner* — Kevin T Bates
*Assistant Examiner* — Golam Mahmud
(74) *Attorney, Agent, or Firm* — Taft Stettinius & Hollister LLP

(57) ABSTRACT

A method of dynamic prioritization of collaboration between human and virtual agents according to an embodiment includes generating a priority score for a conversation between a human user and a chat bot, wherein the priority score is based on at least a sentiment of the human user and a temporal aspect of the conversation, providing the priority score to a human agent via an interface for monitoring the priority score, transferring control of the conversation from the chat bot to the human agent based on an interaction of the human agent with the interface, and yielding control of the conversation from the human agent back to the chat bot in response to another interaction of the human agent with the interface.

18 Claims, 8 Drawing Sheets

(56) References Cited

U.S. PATENT DOCUMENTS

| | | | | |
|---|---|---|---|---|
| 2008/0028031 | A1* | 1/2008 | Bailey | G06Q 10/10 |
| | | | | 709/206 |
| 2010/0174813 | A1* | 7/2010 | Hildreth | G06Q 10/107 |
| | | | | 709/224 |
| 2016/0330156 | A1* | 11/2016 | Dunne | H04L 67/02 |
| 2017/0118341 | A1* | 4/2017 | Kelly | H04M 3/58 |
| 2017/0358296 | A1* | 12/2017 | Segalis | H04M 3/42042 |
| 2018/0234367 | A1* | 8/2018 | Lange | G06F 16/958 |
| 2019/0052584 | A1* | 2/2019 | Barve | G06Q 10/04 |
| 2019/0208062 | A1* | 7/2019 | Shaffer | G10L 15/1815 |
| 2019/0215249 | A1* | 7/2019 | Renard | H04L 65/1066 |
| 2019/0334849 | A1* | 10/2019 | Bostick | H04L 12/1895 |
| 2020/0137002 | A1* | 4/2020 | Chavda | G06N 20/00 |
| 2020/0201913 | A1* | 6/2020 | Terry | G06Q 30/0281 |
| 2020/0211536 | A1* | 7/2020 | Shmueli-Scheuer | G06N 5/041 |
| 2020/0244605 | A1* | 7/2020 | Nagaraja | H04L 51/02 |
| 2020/0366564 | A1* | 11/2020 | Davis | H04M 3/5175 |
| 2021/0136203 | A1* | 5/2021 | Paiva | H04M 3/4933 |
| 2021/0136216 | A1* | 5/2021 | Paiva | G10L 15/22 |
| 2021/0160373 | A1 | 5/2021 | McGann et al. | |
| 2022/0199080 | A1* | 6/2022 | Eyben | G10L 15/063 |

OTHER PUBLICATIONS

International Preliminary Report on Patentability; IPEA/US; International Application No. PCT/US2022/033248; dated Oct. 24, 2023; 27 pages.

\* cited by examiner

DYNAMIC PRIORITIZATION OF COLLABORATION BETWEEN HUMAN AND VIRTUAL AGENTS

BACKGROUND

Many systems support escalating chat bot interactions to human agents. The escalation in these cases, however, is at the discretion of the chat bot service, and the transition from the chat bot to the human agent creates a "hard break" from the chat bot such that control is not subsequently returned back to the chat bot. As such, if a chat bot is to be used for a particular user interaction, it is used at the outset and only remains part of the user interaction for as long as it maintains unbroken control of that interaction. Once the chat bot loses control, the interaction takes on a different form. Although this strict bot-then-agent pattern works for many simple use cases, this communication flow is too rigid to support many of the more complicated or sophisticated user interactions.

SUMMARY

One embodiment is directed to a unique system, components, and methods for dynamic prioritization of collaboration between human and virtual agents. Other embodiments are directed to apparatuses, systems, devices, hardware, methods, and combinations thereof for dynamic prioritization of collaboration between human and virtual agents.

According to an embodiment, a method of dynamic prioritization of collaboration between human and virtual agents may include generating a priority score for a conversation between a human user and a chat bot, wherein the priority score is based on at least a sentiment of the human user and a temporal aspect of the conversation, providing the priority score to a human agent via an interface for monitoring the priority score, transferring control of the conversation from the chat bot to the human agent based on an interaction of the human agent with the interface, and yielding control of the conversation from the human agent back to the chat bot in response to another interaction of the human agent with the interface.

In some embodiments, the priority score may be a weighted sum of at least a first metric associated with a real-time sentiment of the human user and a second metric associated with a real-time response wait time of the human user in conversation.

In some embodiments, the first metric may prioritize negative real-time sentiment of the human user.

In some embodiments, the first metric may prioritize positive real-time sentiment of the human user.

In some embodiments, the first metric may prioritize extreme real-time sentiment of the human user.

In some embodiments, the second metric may be a ratio of the human user's wait time in the conversation to an expected wait time.

In some embodiments, the priority score may be further based on a topic of the conversation, and the priority score may be a weighted sum of a first metric associated with a real-time sentiment of the human user, a second metric associated with a real-time response wait time of the human user in the conversation, and a third metric associated with the topic of the conversation.

In some embodiments, the method may further include performing bot-driven interaction pacing to the conversation by providing filler content by the chat bot based on the priority score.

In some embodiments, generating the priority score for the conversation may include generating the priority score based on a sequence of time-stamped messages that constitute the conversation.

In some embodiments, the method may further include providing a plurality of priority scores for corresponding conversations between human users and chat bots to the human agent via the interface for monitoring the priority scores.

In some embodiments, the priority score may be a based on a plurality of weighted metrics, and one or more weights of the plurality of weighted metrics may be adjustable.

According to another embodiment, a system for dynamic prioritization of collaboration between human and virtual agents may include at least one processor and at least one memory comprising a plurality of instructions stored thereon that, in response to execution by the at least one processor, causes the system to generate a priority score for a conversation between a human user and a chat bot, wherein the priority score is based on at least a sentiment of the human user and a temporal aspect of the conversation, provide the priority score to a human agent via an interface for monitoring the priority score, transfer control of the conversation from the chat bot to the human agent based on an interaction of the human agent with the interface, and yield control of the conversation from the human agent back to the chat bot in response to another interaction of the human agent with the interface.

In some embodiments, the priority score may be a weighted sum of at least a first metric associated with a real-time sentiment of the human user and a second metric associated with a real-time response wait time of the human user in conversation.

In some embodiments, the first metric may prioritize one of negative real-time sentiment of the human user, positive real-time sentiment of the human user, or extreme real-time sentiment of the human user.

In some embodiments, the second metric may be a ratio of the human user's wait time in the conversation to an expected wait time.

In some embodiments, the priority score may be further based on a topic of the conversation, and the priority score may be a weighted sum of a first metric associated with a real-time sentiment of the human user, a second metric associated with a real-time response wait time of the human user in the conversation, and a third metric associated with the topic of the conversation.

In some embodiments, the plurality of instructions may further cause the system to perform bot-driven interaction pacing to the conversation by providing filler content by the chat bot based on the priority score.

In some embodiments, to generate the priority score for the conversation may include to generate the priority score based on a sequence of time-stamped messages that constitute the conversation.

In some embodiments, the plurality of instructions may further cause the system to provide a plurality of priority scores for corresponding conversations between human users and chat bots to the human agent via the interface for monitoring the priority scores.

In some embodiments, the priority score may be a based on a plurality of weighted metrics, and one or more weights of the plurality of weighted metrics may be adjustable.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
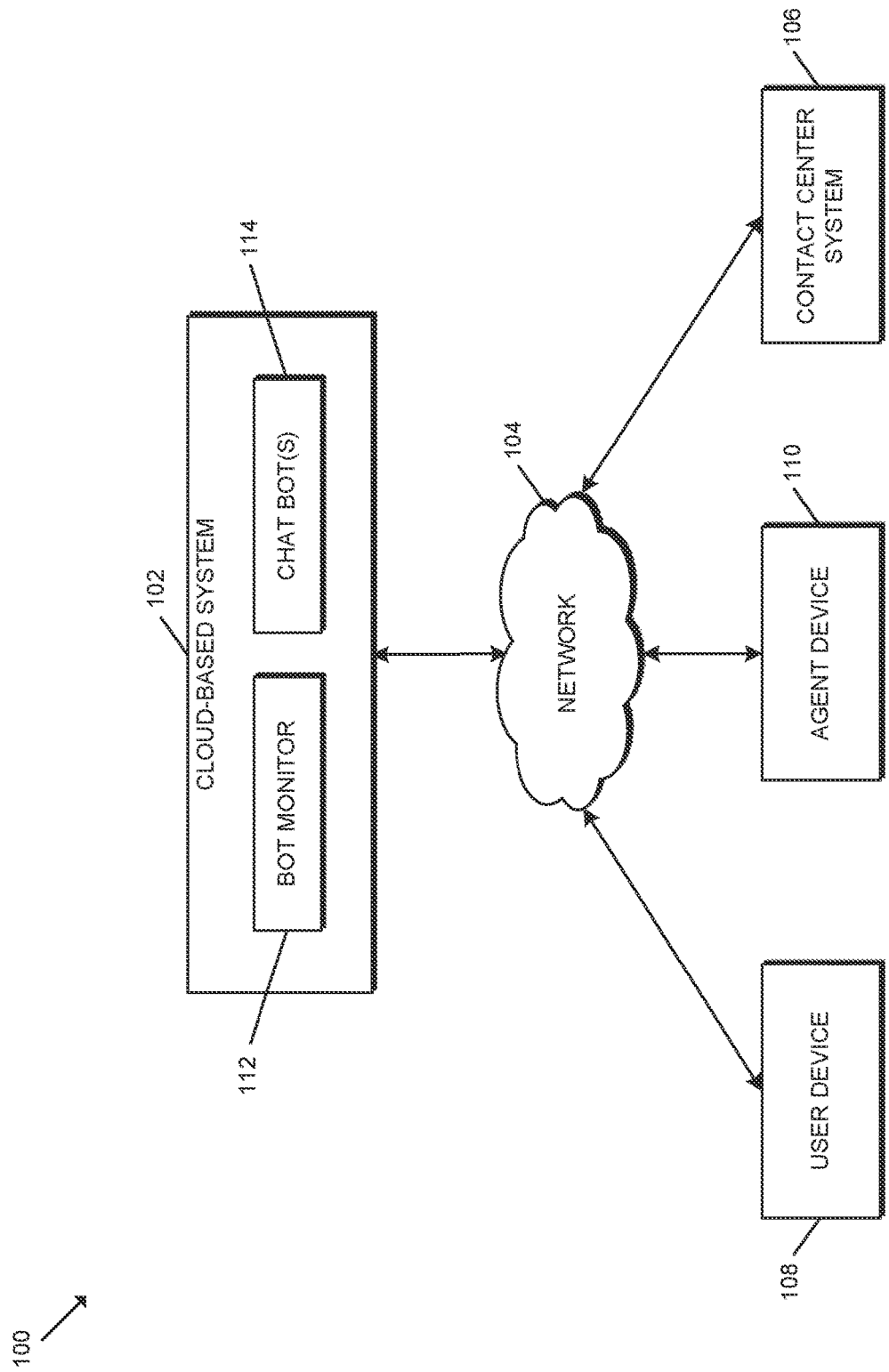
FIG. 1 is a simplified block diagram of at least one embodiment of a system for dynamic prioritization of collaboration between human and virtual agents.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for dynamic prioritization of collaboration between human and virtual agents includes a cloud-based system 102, a network 104, a contact center system 106, a user device 108, and an agent device 110. Additionally, the illustrative cloud-based system 102 includes a bot monitor 112 and one or more chat bot(s) 114. Although only one cloud-based system 102, one network 104, one contact center system 106, one user device 108, one agent device 110, and one bot monitor 112 are shown in the illustrative embodiment of FIG. 1, the system 100 may include multiple cloud-based systems 102, networks 104, contact center systems 106, user devices 108, agent devices 110, and/or bot monitors 112 in other embodiments. For example, in some embodiments, multiple cloud-based systems 102 (e.g., related or unrelated systems) may be used to perform the various functions described herein. Further, as described below, it should be appreciated that a particular agent may use the agent device 110 to monitor multiple chat bots 114 concurrently via the bot monitor 112 or an interface thereof. In some embodiments, one or more of the systems described herein may be excluded from the system 100, one or more of the systems described as being independent may form a portion of another system, and/or one or more of the systems described as forming a portion of another system may be independent.

As described herein, it will be appreciated that the system 100 allows for seamless, repeatable transitions of control over a user interaction/conversation back-and-forth between agents and chat bots. In particular, the illustrative system 100 allows a human agent to monitor one or more chat bots 114 (e.g., using the bot monitor 112). The human agent can seize control of an interaction at any time, thereby allowing the agent to interject chat bot 114 responses to the user. After the human agent has addressed the issue(s) that led the agent to intervene and seize control of the interaction/conversation, the agent can yield control of the interaction/conversation back to the chat bot 114. Accordingly, the system 100 allows for bidirectional, repeatable transfers of control between agents and bots, and it makes possible agent-initiated escalation.

It should be appreciated that each of the cloud-based system 102, network 104, contact center system 106, user device 108, agent device 110, bot monitor 112, and chat bot(s) 114 may be embodied as any type of device/system, collection of devices/systems, or portion(s) thereof suitable for performing the functions described herein.

The cloud-based system 102 may be embodied as any one or more types of devices/systems capable of performing the functions described herein. For example, in the illustrative embodiment, the cloud-based system 102 (e.g., using the bot monitor 112) is configured to analyze interactions/conversations (e.g., in real time) occurring between chat bots 114 and corresponding users to generate a priority score for each interaction/conversation that is indicative of a priority in which a human agent should intervene in the conversation and seize control from the corresponding chat bot 114. In the illustrative embodiment, the priority scores are provided to a human agent (e.g., via the agent device 110 and an interface with the bot monitor 112) in order to allow the human agent to monitor the priority scores of multiple user conversations with chat bots 114 concurrently. The bot monitor 112 allows the human agent, for example, to focus her attention on the chat bot conversations for which human attention is a high priority, while allowing the chat bots 114 to continue the other conversations with little attention from the human agent. Further, via the bot monitor 112, the human agent is able to intervene in any of the conversations between the respective human users and chat bots 114 and seize control of the conversation (e.g., as a "stand in" for the chat bot 114, with or without alerting the human user of the transfer or control). The human agent is then able to communicate with the user directly to address any issues (e.g., issues that resulted in a high priority score) and then potentially yield control back to the chat bot 114 while maintaining the conversational context. Additionally, in some embodiments, the cloud-based system 102 allows for bot-driven interaction pacing, whereby the chat bot 114 may provide filler content to the human user while waiting in order to ameliorate the user's perception of the conversation.

Although the cloud-based system 102 is described herein in the singular, it should be appreciated that the cloud-based system 102 may be embodied as or include multiple servers/systems in some embodiments. Further, although the cloud-based system 102 is described herein as a cloud-based system, it should be appreciated that the system 102 may be embodied as one or more servers/systems residing outside of a cloud computing environment in other embodiments. In some embodiments, the cloud-based system 102 may be embodied as, or similar to, the cloud-based system 200 described in reference to FIG. 2. In particular, in some embodiments, the chat bot(s) 114 may be embodied as, or similar to, the chat bot(s) 218 described in reference to FIG. 2.

In cloud-based embodiments, the cloud-based system 102 may be embodied as a server-ambiguous computing solution, for example, that executes a plurality of instructions on-demand, contains logic to execute instructions only when prompted by a particular activity/trigger, and does not consume computing resources when not in use. That is, system 102 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 102 described herein. For example, when an event occurs (e.g., data is transferred to the system 102 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system 102), the appropriate virtual function(s) may be executed to perform the actions before eliminating the instance of the virtual function(s).

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic, and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108, 110, 112, 114 of the system 100. It should be appreciated that the various devices/systems 102, 106, 108, 110, 112, 114 may communicate with one another via different networks 104 depending on the source and/or destination devices/systems 102, 106, 108, 110, 112, 114.

In some embodiments, it should be appreciated that the cloud-based system 102 may be communicatively coupled to the contact center system 106, form a portion of the contact center system 106, and/or be otherwise used in conjunction with the contact center system 106. For example, the contact center system 106 may include a chat bot (e.g., similar to the chat bot 218 of FIG. 2) configured to communicate with a user (e.g., via the user device 108). Further, in some embodiments, the user device 108 may communicate directly with the cloud-based system 102.

The contact center system 106 may be embodied as any system capable of providing contact center services (e.g., call center services) to an end user and otherwise performing the functions described herein. Depending on the particular embodiment, it should be appreciated that the contact center system 106 may be located on the premises/campus of the organization utilizing the contact center system 106 and/or located remotely relative to the organization (e.g., in a cloud-based computing environment). In some embodiments, a portion of the contact center system 106 may be located on the organization's premises/campus while other portions of the contact center system 106 are located remotely relative to the organization's premises/campus. As such, it should be appreciated that the contact center system 106 may be deployed in equipment dedicated to the organization or third-party service provider thereof and/or deployed in a remote computing environment such as, for example, a private or public cloud environment with infrastructure for supporting multiple contact centers for multiple enterprises. In some embodiments, the contact center system 106 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center.

The user device 108 may be embodied as any type of device capable of executing an application and otherwise performing the functions described herein. For example, in some embodiments, the user device 108 is configured to execute an application to participate in a conversation with a personal bot, automated agent, chat bot, or other automated system. As such, the user device 108 may have various input/output devices with which a user may interact to provide and receive audio, text, video, and/or other forms of data. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

The agent device 110 may be embodied as any type of device capable of executing an application and otherwise performing the functions described herein. For example, in some embodiments, the agent device 110 is configured to execute an application to interface with the bot monitor 112 and/or communicate with human users via corresponding user devices 108 (e.g., via the bot monitor 112). Otherwise, it should be appreciated that the agent device 110 may be similar to the user device 108 described above, the description of which is not repeated for brevity of the description.

It should be appreciated that each of the cloud-based system 102, the network 104, the contact center system 106, the user device 108, and/or the agent device 110 may be embodied as (and/or include) one or more computing devices similar to the computing device 300 described below in reference to FIG. 3. For example, in the illustrative embodiment, each of the cloud-based system 102, the network 104, the contact center system 106, the user device 108, and/or the agent device 110 may include a processing device 302 and a memory 306 having stored thereon operating logic 308 (e.g., a plurality of instructions) for execution by the processing device 302 for operation of the corresponding device.

Figure 2:
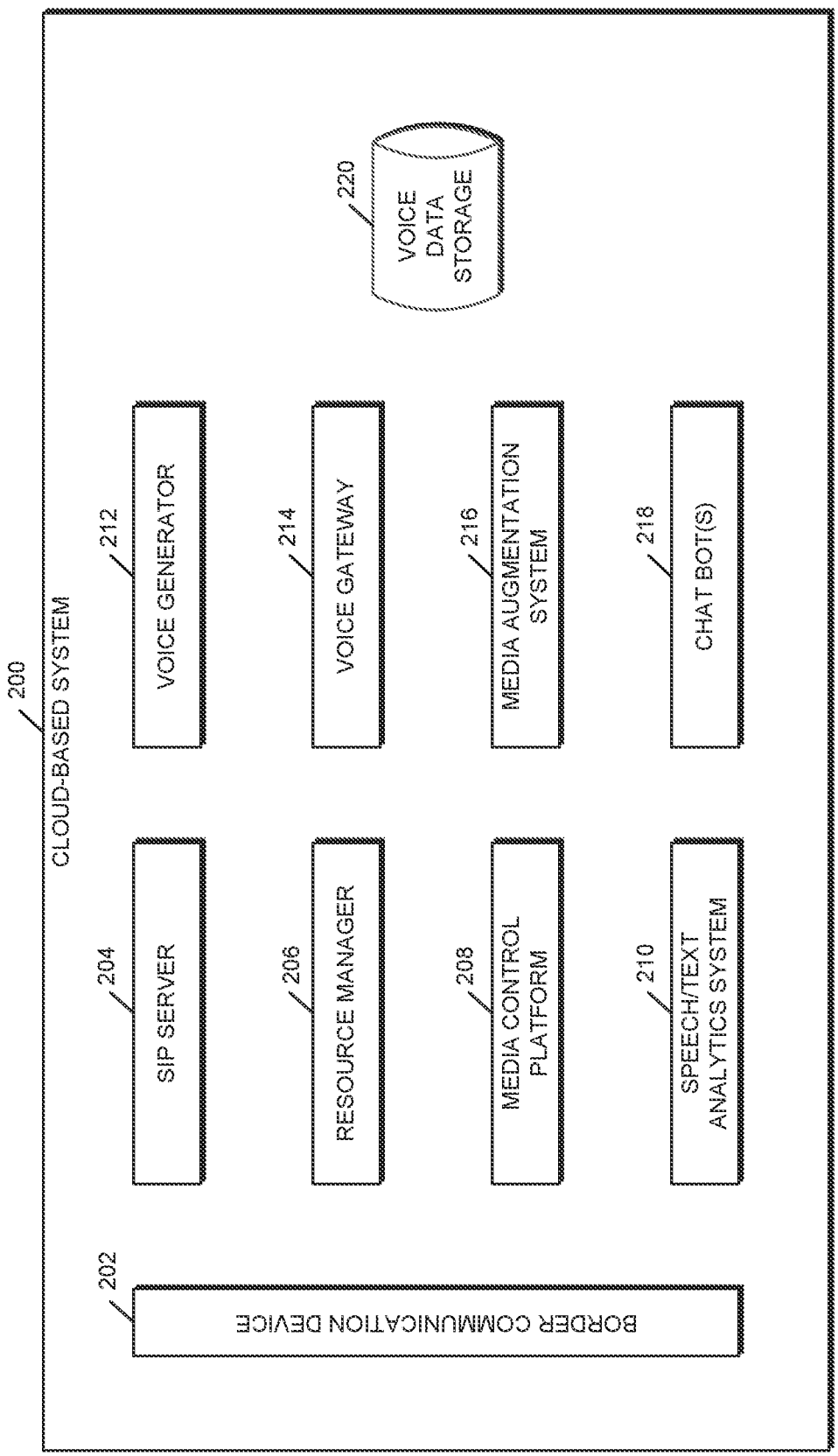
FIG. 2 is a simplified block diagram of at least one embodiment of a cloud-based system.

Referring now to FIG. 2, a simplified block diagram of at least one embodiment cloud-based system 200 is shown. The illustrative cloud-based system 200 includes a border communication device 202, a SIP server 204, a resource manager 206, a media control platform 208, a speech/text analytics system 210, a voice generator 212, a voice gateway 214, a media augmentation system 216, a chat bot 218, and voice data storage 220. Although only one border communication device 202, one SIP server 204, one resource manager 206, one media control platform 208, one speech/text analytics system 210, one voice generator 212, one voice gateway 214, one media augmentation system 216, one chat bot 218, and one voice data storage 220 are shown in the illustrative embodiment of FIG. 2, the cloud-based system 200 may include multiple border communication devices 202, SIP servers 204, resource managers 206, media control platforms 208, speech/text analytics systems 210, voice generators 212, voice gateways 214, media augmentation systems 216, chat bots 218, and/or voice data storages 220 in other embodiments. For example, in some embodiments, multiple chat bots 218 may be used to communicate regarding different subject matters handled by the same cloud-based system 200, and/or multiple chat bots 218 or instances thereof may be used to communicate with different users. Further, in some embodiments, one or more of the components described herein may be excluded from the system 200, one or more of the components described as being independent may form a portion of another component, and/or one or more of the component described as forming a portion of another component may be independent.

The border communication device 202 may be embodied as any one or more types of devices/systems that are capable of performing the functions described herein. For example, in some embodiments, the border communication device 202 may be configured to control signaling and media streams involved in setting up, conducting, and tearing down voice conversations and other media communications between, for example, an end user and contact center system. In some embodiments, the border communication device 202 may be a session border controller (SBC) controlling the signaling and media exchanged during a media session (also referred to as a "call," "telephony call," or "communication session") between the end user and contact center system. In some embodiments, the signaling exchanged during a media session may include SIP, H.323, Media Gateway Control Protocol (MGCP), and/or any other voice-over IP (VoIP) call signaling protocols. The media exchanged during a media session may include media streams that carry the call's audio, video, or other data along with information of call statistics and quality.

In some embodiments, the border communication device 202 may operate according to a standard SIP back-to-back user agent (B2BUA) configuration. In this regard, the border communication device 202 may be inserted in the signaling and media paths established between a calling and called parties in a VoIP call. In some embodiments, it should be understood that other intermediary software and/or hardware devices may be invoked in establishing the signaling and/or media paths between the calling and called parties.

In some embodiments, the border communication device 202 may exert control over the signaling (e.g., SIP messages) and media streams (e.g., RTP data) routed to and from an end user device (e.g., the user device 108) and a contact center system (e.g., the contact center system 106) that traverse the network (e.g., the network 104). In this regard, the border communication device 202 may be coupled to trunks that carry signals and media for calls to and from the user device over the network, and to trunks that carry signals and media to and from the contact center system over the network.

The SIP server 204 may be embodied as any one or more types of devices/systems that are capable of performing the functions described herein. For example, in some embodiments, the SIP server 204 may act as a SIP B2BUA and may control the flow of SIP requests and responses between SIP endpoints. Any other controller configured to set up and tear down VoIP communication sessions may be contemplated in addition to or in lieu of the SIP server 204 in other embodiments. The SIP server 204 may be a separate logical component or may be combined with the resource manager 206. In some embodiments, the SIP server 204 may be hosted at a contact center system (e.g., the contact center system 106). Although a SIP server 204 is used in the illustrative embodiment, another call server configured with another VoIP protocol may be used in addition to or in lieu of SIP, such as, for example, H.232 protocol, Media Gateway Control Protocol, Skype protocol, and/or other suitable technologies in other embodiments.

The resource manager 206 may be embodied as any one or more types of devices/systems that are capable of performing the functions described herein. In the illustrative embodiment, the resource manager 206 may be configured to allocate and monitor a pool of media control platforms for providing load balancing and high availability for each resource type. In some embodiments, the resource manager 206 may monitor and may select a media control platform 208 from a cluster of available platforms. The selection of the media control platform 208 may be dynamic, for example, based on identification of a location of a calling end user, type of media services to be rendered, detected quality of a current media service, and/or other factors.

In some embodiments, the resource manager 206 may be configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to some embodiments, the resource manager may provide hierarchical multi-tenant configurations for service providers, enabling them to apportion a select number of resources for each tenant.

In some embodiments, the resource manager 206 may be configured to act as a SIP proxy, a SIP registrar, and/or a SIP notifier. In this regard, the resource manager 206 may act as a proxy for SIP traffic between two SIP components. As a SIP registrar, the resource manager 206 may accept registration of various resources via, for example, SIP REGISTER messages. In this manner, the cloud-based system 200 may support transparent relocation of call-processing components. In some embodiments, components such as the media control platform 208 do not register with the resource manager 206 at startup. The resource manager 206 may detect instances of the media control platform 208 through configuration information retrieved from the configuration database. If the media control platform 208 has been configured for monitoring, the resource manager 206 may monitor resource health by using, for example, SIP OPTIONS messages. In some embodiments, to determine whether the resources in the group are alive, the resource manager 206 may periodically send SIP OPTIONS messages to each media control platform 208 resource in the group. If the resource manager 206 receives an OK response, the resources are considered alive. It should be appreciated that the resource manager 206 may be configured to perform other various functions, which have been omitted for brevity of the description. The resource manager 206 and the media control platform 208 may collectively be referred to as a media controller.

In some embodiments, the resource manager 206 may act as a SIP notifier by accepting, for example, SIP SUBSCRIBE requests from the SIP server 204 and maintaining multiple independent subscriptions for the same or different SIP devices. The subscription notices are targeted for the tenants that are managed by the resource manager 206. In this role, the resource manager 206 may periodically generate SIP NOTIFY requests to subscribers (or tenants) about port usage and the number of available ports. The resource manager 206 may support multi-tenancy by sending notifications that contain the tenant name and the current status (in- or out-of-service) of the media control platform 208 that is associated with the tenant, as well as current capacity for the tenant.

The media control platform 208 may be embodied as any service or system capable of providing media services and otherwise performing the functions described herein. For example, in some embodiments, the media control platform 208 may be configured to provide call and media services upon request from a service user. Such services may include, without limitation, initiating outbound calls, playing music or providing other media while a call is placed on hold, call recording, conferencing, call progress detection, playing audio/video prompts during a customer self-service session, and/or other call and media services. One or more of the services may be defined by voice applications (e.g. VoiceXML applications) that are executed as part of the process of establishing a media session between the media control platform 208 and the end user.

The speech/text analytics system (STAS) 210 may be embodied as any service or system capable of providing various speech analytics and text processing functionalities (e.g., text-to-speech) as will be understood by a person of skill in the art and otherwise performing the functions described herein. The speech/text analytics system 210 may perform automatic speech and/or text recognition and grammar matching for end user communications sessions that are handled by the cloud-based system 200. The speech/text analytics system 210 may include one or more processors and instructions stored in machine-readable media that are executed by the processors to perform various operations. In some embodiments, the machine-readable media may include non-transitory storage media, such as hard disks and hardware memory systems.

The voice generator 212 may be embodied as any service or system capable of generating a voice communication and otherwise performing the functions described herein. In some embodiments, the voice generator 212 may generate the voice communication based on a particular voice signature.

The voice gateway 214 may be embodied as any service or system capable of performing the functions described herein. In the illustrative embodiment, the voice gateway 214 receives end user calls from or places calls to voice communications devices, such as an end user device, and responds to the calls in accordance with a voice program that corresponds to a communication routing configuration of the contact center system. In some embodiments, the voice program may include a voice avatar. The voice program may be accessed from local memory within the voice gateway 214 or from other storage media in the cloud-based system 200. In some embodiments, the voice gateway 214 may process voice programs that are script-based voice applications. The voice program, therefore, may be a script written in a scripting language, such as voice extensible markup language (VoiceXML) or speech application language tags (SALT). The cloud-based system 200 may also communicate with the voice data storage 220 to read and/or write user interaction data (e.g., state variables for a data communications session) in a shared memory space.

The media augmentation system 216 may be embodied as any service or system capable of specifying how the portions of the cloud-based system 200 (e.g., one or more of the border communications device 202, the SIP server 204, the resource manager 206, the media control platform 208, the speech/text analytics system 210, the voice generator 212, the voice gateway 214, the media augmentation system 216, the chat bot 218, the voice data storage 220, and/or one or more portions thereof) interact with each other and otherwise performing the functions described herein. In some embodiments, the media augmentation system 216 may be embodied as or include an application program interface (API). In some embodiments, the media augmentation system 216 enables integration of differing parameters and/or protocols that are used with various planned application and media types utilized within the cloud-based system 200.

The chat bot 218 may be embodied as any automated service or system capable of using automation to engage with end users and otherwise performing the functions described herein. For example, in some embodiments, the chat bot 218 may operate, for example, as an executable program that can be launched according to demand for the particular chat bot. In some embodiments, the chat bot 218 simulates and processes human conversation (either written or spoken), allowing humans to interact with digital devices as if the humans were communicating with another human. In some embodiments, the chat bot 218 may be as simple as rudimentary programs that answer a simple query with a single-line response, or as sophisticated as digital assistants that learn and evolve to deliver increasing levels of personalization as they gather and process information. In some embodiments, the chat bot 218 includes and/or leverages artificial intelligence, adaptive learning, bots, cognitive computing, and/or other automation technologies. Chat bot 218 may also be referred to herein as one or more chat robots, AI chat bots, automated chat robot, chatterbots, dialog systems, conversational agents, automated chat resources, and/or bots.

A benefit of utilizing automated chat robots for engaging in chat conversations with end users may be that it helps contact centers to more efficiently use valuable and costly resources like human resources, while maintaining end user satisfaction. For example, chat robots may be invoked to handle chat conversations without a human end user knowing that it is conversing with a robot. The chat conversation may be escalated to a human resource if and when appropriate, such as by a human agent monitoring multiple chat bot conversations as described herein. Thus, human resources need not be unnecessarily tied up in handling simple requests and may instead be more effectively used to handle more complex requests or to monitor the progress of many different automated communications at the same time.

The voice data storage 220 may be embodied as one or more databases, data structures, and/or data storage devices capable of storing data in the cloud-based system 200 or otherwise facilitating the storage of such data for the cloud-based system 200. For example, in some embodiments, the voice data storage 220 may include one or more cloud storage buckets. In other embodiments, it should be appreciated that the voice data storage 220 may, additionally or alternatively, include other types of voice data storage mechanisms that allow for dynamic scaling of the amount of data storage available to the cloud-based system 200. In some embodiments, the voice data storage 220 may store scripts (e.g., pre-programmed scripts or otherwise). Although the voice data storage 220 is described herein as data storages and databases, it should be appreciated that the voice data storage 220 may include both a database (or other type of organized collection of data and structures) and data storage for the actual storage of the underlying data. The voice data storage 220 may store various data useful for performing the functions described herein.

Figure 3:
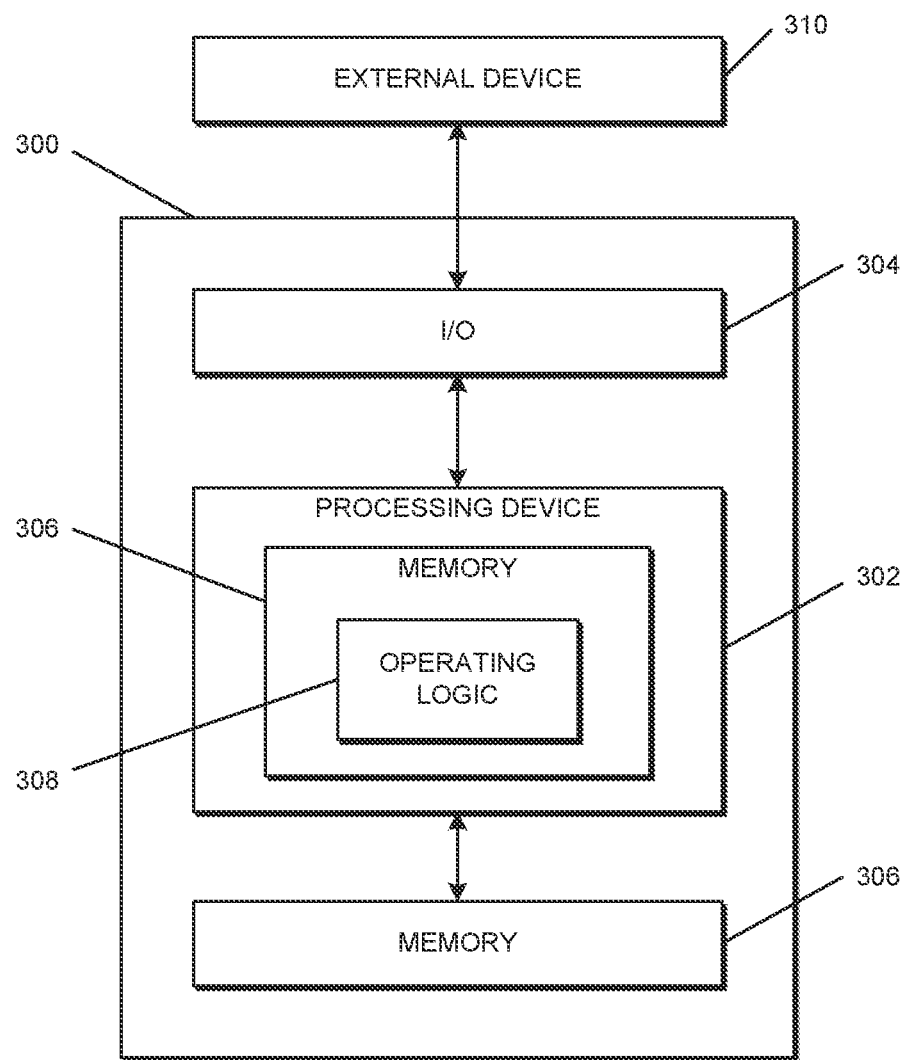
FIG. 3 is a simplified block diagram of at least one embodiment of a computing system.

Referring now to FIG. 3, a simplified block diagram of at least one embodiment of a computing device 300 is shown. The illustrative computing device 300 depicts at least one embodiment of a cloud-based system, contact center system, user device, and/or agent device that may be utilized in connection with the cloud-based system 102, the contact center system 106, the user device 108, and/or the agent device 110 (and/or a portion thereof) illustrated in FIG. 1. Further, in some embodiments, one or more of the border communications device 202, the SIP server 204, the resource manager 206, the media control platform 208, the speech/text analytics system 210, the voice generator 212, the voice gateway 214, the media augmentation system 216, the chat bot 218, and/or the voice data storage 220 (and/or a portion thereof) may be embodied as or executed by a computing device similar to the computing device 300. Depending on the particular embodiment, the computing device 300 may be embodied as a server, desktop computer, laptop computer, tablet computer, notebook, netbook, Ultrabook™ cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the cloud-based system 102, the contact center system 106, the user device 108, and/or a portion thereof. Further, in some embodiments, the external device 310 may be embodied as another computing device, switch, diagnostic tool, controller, printer, display, alarm, peripheral device (e.g., keyboard, mouse, touch screen display, etc., and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
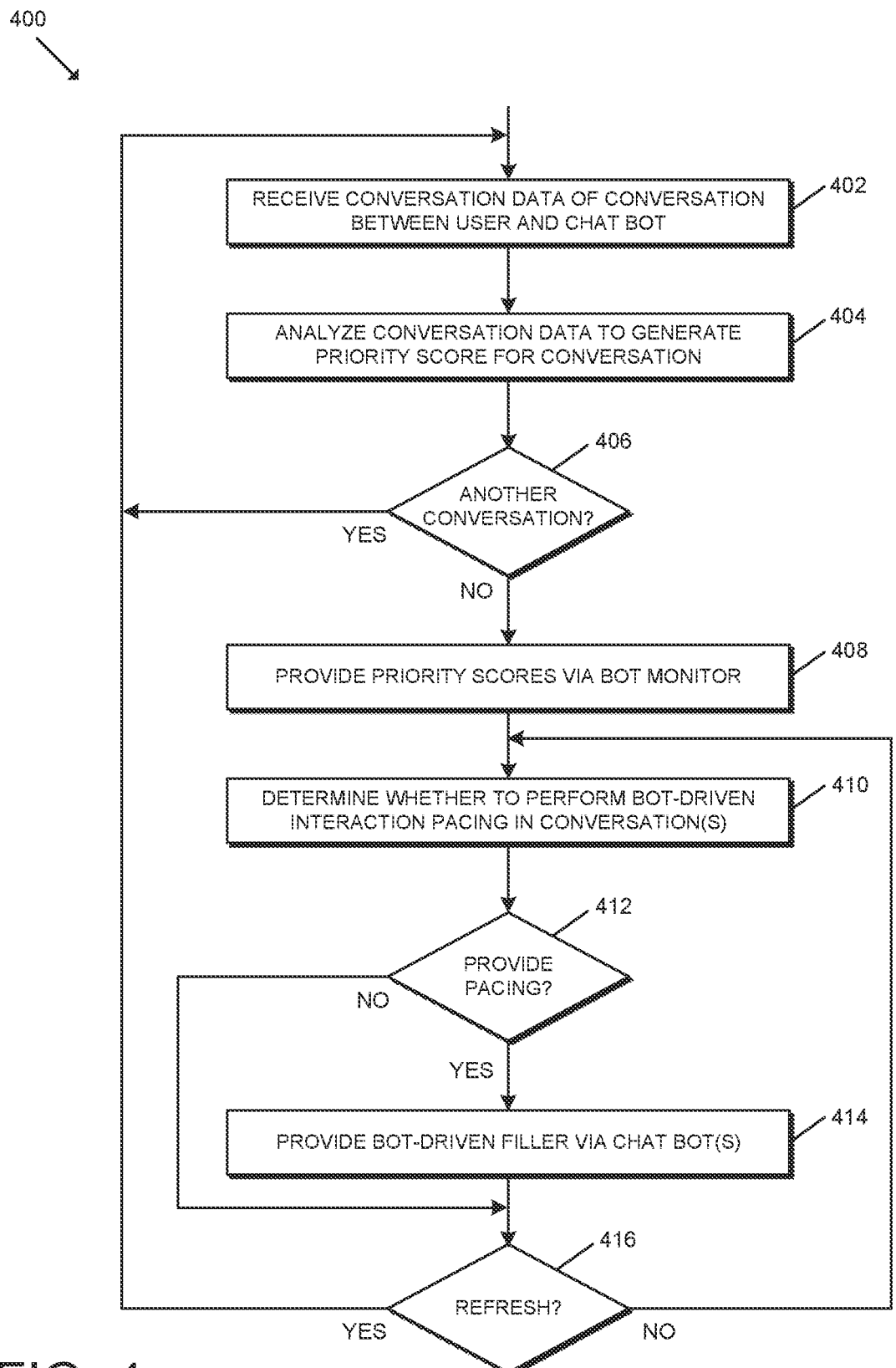
FIG. 4 is a simplified flow diagram of at least one embodiment of a method for dynamic prioritization of collaboration between human and virtual agents.

Referring now to FIG. 4, in use, the system 100 (e.g., the cloud-based system 102) may execute a method 400 for dynamic prioritization of collaboration between human and virtual agents. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the system 100 receives conversation data of a conversation between a human user and a chat bot 114. For example, in some embodiments, the conversation data may include or be represented as a sequence of time-stamped messages that constitute the conversation or a portion thereof. As described herein, it should be appreciated that conversation data may be received in real time (which should be understood to include near real time).

In block 404, the system 100 analyzes the conversation data to generate a priority score for the conversation. To do so, in some embodiments, the system 100 may execute the method 500 of FIG. 5 described below. It should be appreciated that the priority score is indicative of a priority in which a human agent should intervene in and take control of the conversation from the chat bot 114.

In block 406, the system 100 determines whether to process another conversation. For example, each human agent may monitor multiple conversations between chat bots 114 and corresponding human users concurrently via the bot monitor 112. Accordingly, in the illustrative embodiment, the system 100 determines whether there are any further conversations between chat bots 114 and users to process for that particular agent. It should be appreciated that the number of concurrent conversations monitored by a particular human agent may vary depending on the particular embodiment and/or circumstances. If the system 100 determines that there are further conversations to be processed, the method 400 returns to block 402 to receive conversation data associated with another conversation for processing in block 404.

However, if all relevant conversations have been processed, the method 400 advances to block 408 in which the system 100 provides the priority scores generated for the conversations to the agent (e.g., for display on the agent device 110) via the bot monitor 112. For example, in some embodiments, the priority scores may be displayed to the agent via an interface similar to the interface 700 of FIGS. 7-8, which is described in greater detail below.

In block 410, the system 100 determines whether to perform bot-driven interaction pacing in one or more of the conversations between a chat bot 114 and corresponding human user. If the system 100 determines, in block 412, to provide such pacing, then the method 400 advances to block 414 in which the system 100 provides bot-driven content filler via the relevant chat bot(s) 114. For example, in some embodiments, the system 100 may leverage bot-driven interaction pacing when the cognitive load on a particular agent is too high, when the agent is backlogged (e.g., to keep the user occupied), or if it is otherwise prudent to automatically engage with the user. In some cases, the content filler may be chit-chat or banter. In other cases, the chat bot 114 may play audio, tell a joke, or otherwise entertain the human user.

It should be appreciated that, combined with prioritization via priority scores, bot-driven interaction pacing allows interactions with users to degrade gracefully. If an agent is too busy to address a low-priority conversation, the bot may be able to provide content filler. However, while this is an acceptable temporary remedy, the interaction quality is likely to degrade over time as the chat bot 114 provides more filler. As such, eventually the interaction's priority (e.g., reflected in the priority score) may increase to a point at which the human agent is alerted to intervene, allowing the agent to directly address the user's issue at hand. Accordingly, in some embodiments, the system 100 may determine whether to provide content filler based on the priority score of a particular conversation. Thereafter, the chat bot 114 may continue to pace the conversation with filler.

In some embodiments, after content filler begins, it may continue for some time (e.g., 30 seconds) or may complete a natural sequence of conversation (e.g., finish telling a joke) so as to provide buffer for the human agent. From the user's perspective, the interaction quality is intended not to go "over an edge." Rather, the interaction degrades slowly in the form of friendly filler before being transferred to a human agent via interaction prioritization as described herein.

Whether or not bot-driven interaction pacing is provided (e.g., as content filler) in block 414, the method 400 advances to block 416 in which the system 100 determines whether to refresh the priority scores for the respective conversations. For example, in some embodiments, the system 100 may be configured to refresh each of the priority scores periodically (e.g., every second or other suitable period). In other embodiments, the system 100 may refresh the priority scores in response to the satisfaction of some other criteria. If the system 100 determines to fresh one or more of the priority scores, the method 400 returns to block 402. If not, the method 400 returns to block 410.

Although the blocks 402-416 are described in a relatively serial manner, it should be appreciated that various blocks of the method 400 may be performed in parallel in some embodiments. In particular, in some embodiments, the features related to priority score generation and display may be performed in parallel with the features related to bot-driven interaction pacing of conversations.

Figure 5:
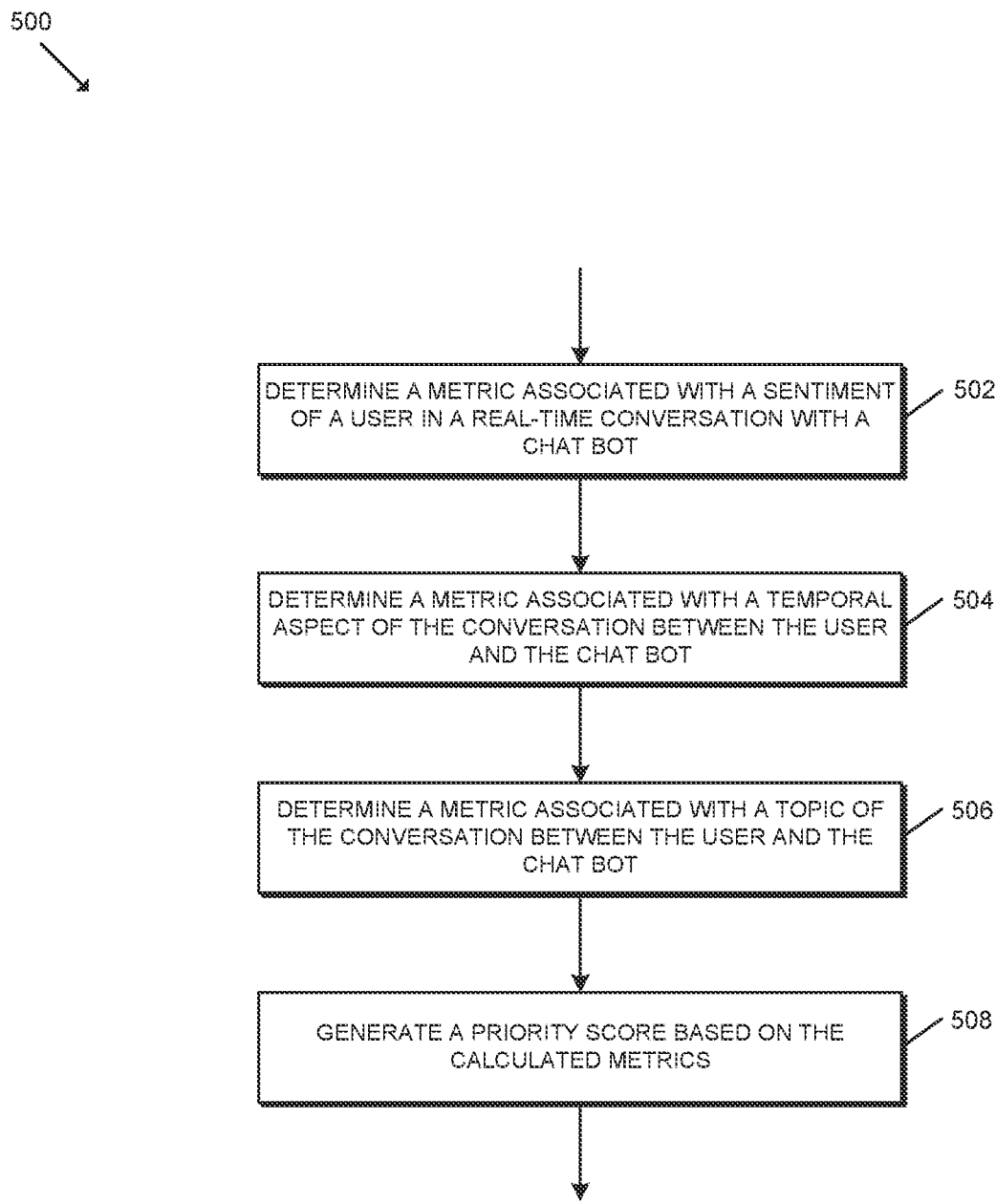
FIG. 5 is a simplified flow diagram of at least one embodiment of a method for generating a priority score.

Referring now to FIG. 5, in use, the system 100 (e.g., the cloud-based system 102) may execute a method 500 for generating a priority score. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 400 begins with block 402 in which the system 100 determines a metric associated with a sentiment of a human user in a conversation with the chat bot 114 (e.g., in real time). It should be appreciated that different embodiments may call for different emphasis on the user's sentiment. For example, in some embodiments, it may be appropriate to emphasize/prioritize negative sentiment of the user, whereas in other embodiments, it may be appropriate to emphasize/prioritize positive sentiment of the user. In yet other embodiments, it may be appropriate to emphasize extreme sentiment of the user. Accordingly, the sentiment metric may reflect that prioritization in the system configuration. For example, suppose sen(C) is a function having an independent variable C and an output scalar between −1 (indicating maximum negative sentiment) and +1 (indicating maximum positive sentiment), wherein C represents the conversation as a sequence of time-stamped messages $msg_1, \ldots, msg_m$ and m represents the number of messages in the conversation.

In an embodiment in which negative sentiment is prioritized, the sentiment metric may be calculated according to $f_{sen}(C)=\max\{0, -sen(C)\}$. In an embodiment in which positive sentiment is prioritized, the sentiment metric may be calculated according to $f_{sen}(C)=\max\{0, sen(C)\}$. In an embodiment in which extreme sentiment is prioritized, the sentiment metric may be calculated according to $f_{sen}(C)=|sen(C)|$.

It should be appreciated that the system 100 may use any suitable technique and/or algorithm to determine the sentiment of the user that is used to calculate the sentiment metric. For example, in some embodiments, the system 100 may leverage a natural language processing algorithm to make such determinations. It should be further appreciated that the system 100 may otherwise determine and/or quantify the sentiment in other embodiments.

In block 404, the system 100 determines a metric associated with a temporal aspect of the conversation between the human user and the chat bot 114. For example, in some embodiments, the system 100 may determine a real-time response wait time of the human user in the conversation since the last response from the chat bot 114. In particular, the system 100 may calculate the metric as a ratio of the human user's wait time in the conversation to an expected wait time. For example, in some embodiments, the timing metric may be calculated according to $$f_{tim}(C) = \frac{t}{\lambda_c^{-1}} = \lambda_c t$$

wherein $\lambda_c$ represents the message rate of the conversation and t represents the time in the conversation. It should be appreciated that such a timing metric is intuitive in that faster conversations gain priority at a faster rate than slow conversations, and interactions gain priority at a constant rate rather than an unintuitive nonlinear rate. Therefore, adjustments to the timing metric weights are easier to configure using such a metric. That said, it should be appreciated that non-linear and/or other linear metrics may be used to calculate temporal aspects of the conversation in other embodiments.

In some embodiments, the timing component of the priority score may be affected by content filler and/or pacing provided by a particular chat bot 114 as described herein. To the extent that is the case, the system 100 may provide a weighting and/or otherwise account for the use of the filler (e.g., using a threshold) to ensure that the priority score does not remain low due to the filler. It should be appreciated that such features help to avoid situations in which a human agent is alerted too late, or never alerted at all, to engage or re-engage with the user.

In block 406, the system 100 determines a metric associated with a topic of the conversation between the human user and the chat bot 114. For example, in some embodiments, the system 100 may determine a set of topics and each of the topics may have a particular scalar value assigned to it that is representative of its importance or priority. In other words, in some embodiments, the topics may be arranged by order of importance, and a topic that is more important than another will be assigned a greater scalar value. However, it should be appreciated that the topic metric may be calculated or determined in another manner in other embodiments.

In block 508, the system 100 generates a priority score based on the calculated metrics. For example, in some embodiments, the system 100 may generate a priority score based on the metric associated with the sentiment of the human user, the metric associated with the temporal aspect of the conversation between the human user and the chat bot 114, and the metric associated with the topic of the conversation between the human user and the chat bot 114.

In some embodiments, it should be appreciated that the priority score may be generated/calculated as a weighted sum of the relevant metrics. In other words, in some embodiments, the priority score may be generated/calculated as a sum of various metrics multiplied by corresponding weights (i.e., a sum of weighted metrics). In particular, in some embodiments, the priority score may be calculated according to:

$$\text{priority }(C) = \sum_{i}^{n} w_i f_i(C),$$

where $$C = \{msg_1, \ldots, msg_m\}$$

wherein i represents the index, C represents the conversation represented as a sequence of time-stamped messages $msg_1, \ldots, msg_m$, m represents the number of messages in the conversation, $f_i(C)$ represents the corresponding metric/function, $w_i$ represents the corresponding weight for the metric, and n represents the number of metrics/functions. For example, in an embodiment in which only sentiment, topic, and timing are used as metrics, the priority score may be generated/calculated according to:

$$\text{priority}(C) = w_{sen} f_{sen}(C) + w_{top} f_{top}(C) + w_{tim} f_{tim}(C).$$

Although the priority score is described herein primarily as being a weighted sum of the metrics, it should be appreciated that the priority score may otherwise be calculated based on the metrics in other embodiments (e.g., as another combination of weighted or non-weighted metrics). Additionally, although the conversation is described as a time-stamped sequence of messages, it should be appreciated that the conversation and analysis thereof may include non-textual components in some embodiments. Further, in some embodiments, the particular weights assigned to the various metrics may be pre-defined by the system 100, whereas in other embodiments, the weights may be adjustable (e.g., by the system configuration and/or the particular human agent) depending on the particular embodiment.

Further, it should be appreciated that, in some embodiments, the system 100 may leverage one or more machine learning techniques to generate the priority score and/or update an aspect thereof (e.g., the particular weights). As such, in some embodiments, the weights may be learned and/or adapted to user behavior. In some embodiments, the system 100 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms.

As indicated above, the method 500 describes sentiment, timing, and topic as metrics used in calculating the priority score. However, it should be appreciated that additional and/or alternative metrics may be used in other embodiments. For example, in some embodiments, the metrics may include the cognitive load of the human agent, the time within the agent's shift (e.g., as the agent may be getting tired toward the end of a shift), a decaying factor that accounts for a negative conversation affecting subsequent conversations that the human agent has with users due to the negative experience, the next best action, and/or other metrics.

Although the blocks 502-508 are described in a relatively serial manner, it should be appreciated that various blocks of the method 500 may be performed in parallel in some embodiments.

Figure 6:
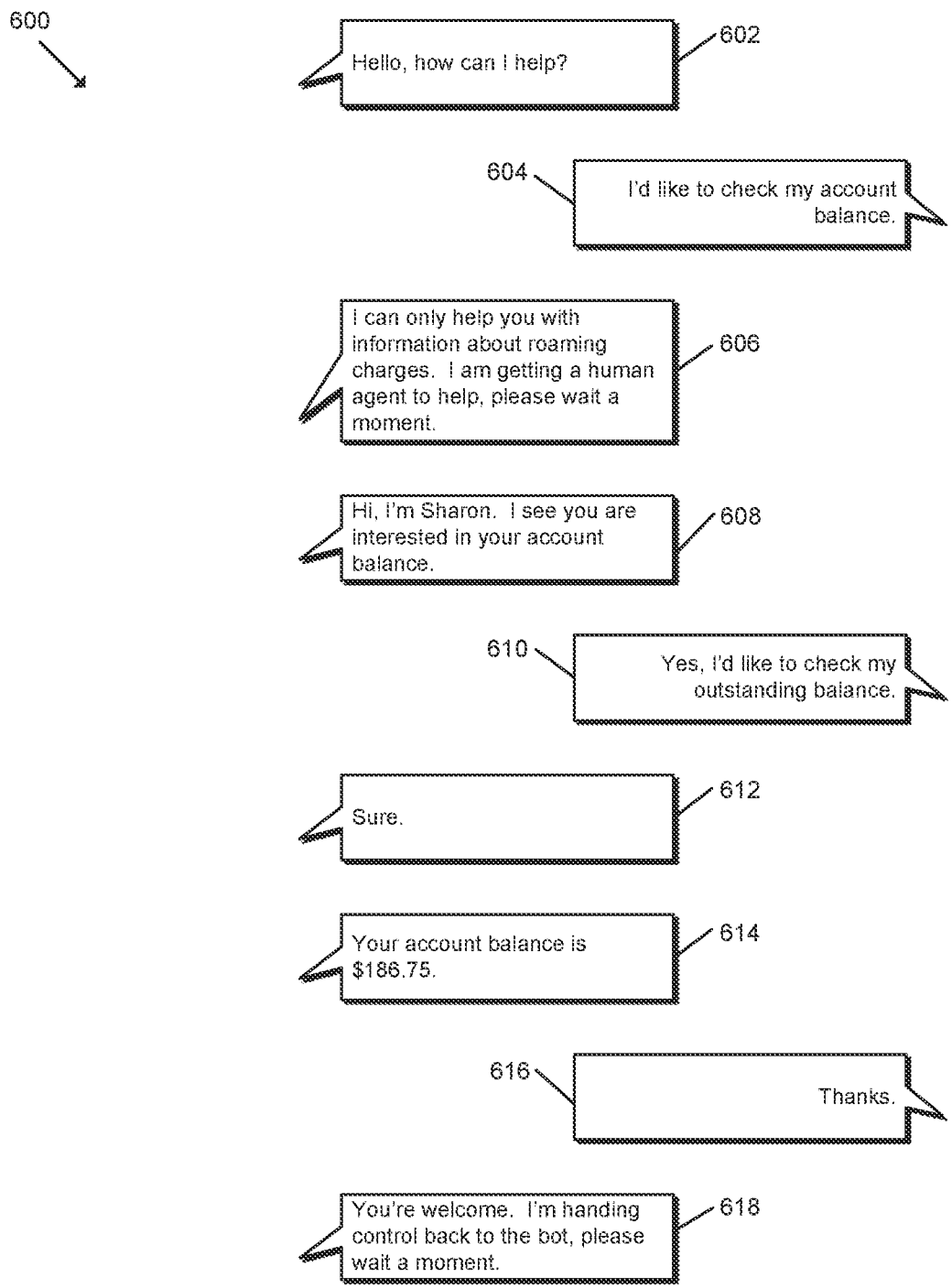
FIG. 6 is a sample dialogue between a human user and a chat bot in which a human agent intervenes.

Referring now to FIG. 6, a sample dialogue 600 between a human user and a chat bot 114 in which a human agent intervenes is depicted. The sample dialogue 600 assumes that the user has connected with the chat bot 114 service, such that the chat bot 114 prompts, "Hello, how can I help?" in message 602. In message 604, the user responds, "I'd like to check my account balance." In the illustrative dialogue 600, the chat bot 114 is not equipped to address the user's concerns regarding the account balance. Accordingly, in message 606, the chat bot 114 replies, "I can only help you with information about roaming charges. I am getting a human agent to help, please wait a moment."

It should be appreciated that messages similar to the message 606 may occur due to various different factors. For example, in some embodiments, the chat bot 114 may recognize its inability to address the user's concerns and proactively attempt to transfer the conversation to a human agent, which may not be possible if all agents are busy. In other embodiments, the chat bot 114 may simply have indicated that it is requesting an agent as a mechanism to pace the conversation (e.g., as content filler) while the priority score is adjusted to reflect the current state and priority of the conversation. In other contexts, a message similar to the message 606 may be a result of the human agent recognizing that the priority score reflects that intervention has a high priority and therefore seizing control of the conversation from the chat bot 114, which automatically prompted a message similar to the message 606 in order for the conversation to be seamless.

In message 608, upon transferring control to the human agent, the human agent indicates, "Hi, I'm Sharon. I see you are interested in your account balance." In message 610, the user again replies, "Yes, I'd like to check my outstanding balance." In message 612, the human agent replies, "Sure." And, after looking up the relevant information, in message 614, the human agent provides, "Your account balance is $186.75." In message 616, the user thanks the agent, and in message 618, the agent indicates that control is being transferred back to the chat bot 114.

In this particular sample dialogue 600, the transfer of control between the chat bot 114 and the human agent is candid and conspicuous. However, it should be appreciated that, in other embodiments, the transfer of control between the chat bot 114 and human agent may occur seamlessly without providing any clues of the transfer to the user.

Figure 7:
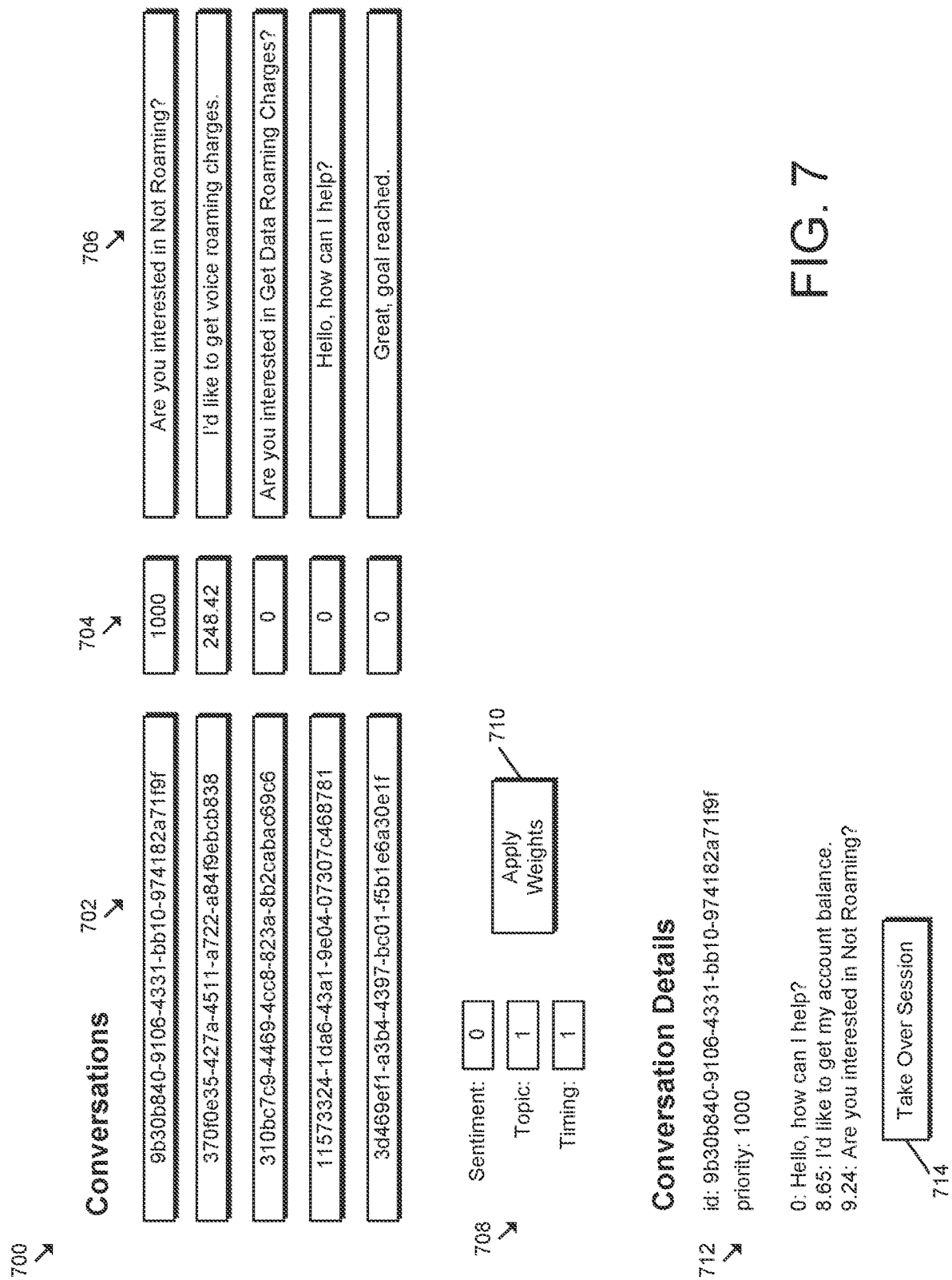
FIGS. 7 and 8 illustrate at least one embodiment of an interface for a bot monitor used by a human agent to monitor and prioritize interaction with one or more chat bots.
Figure 8:
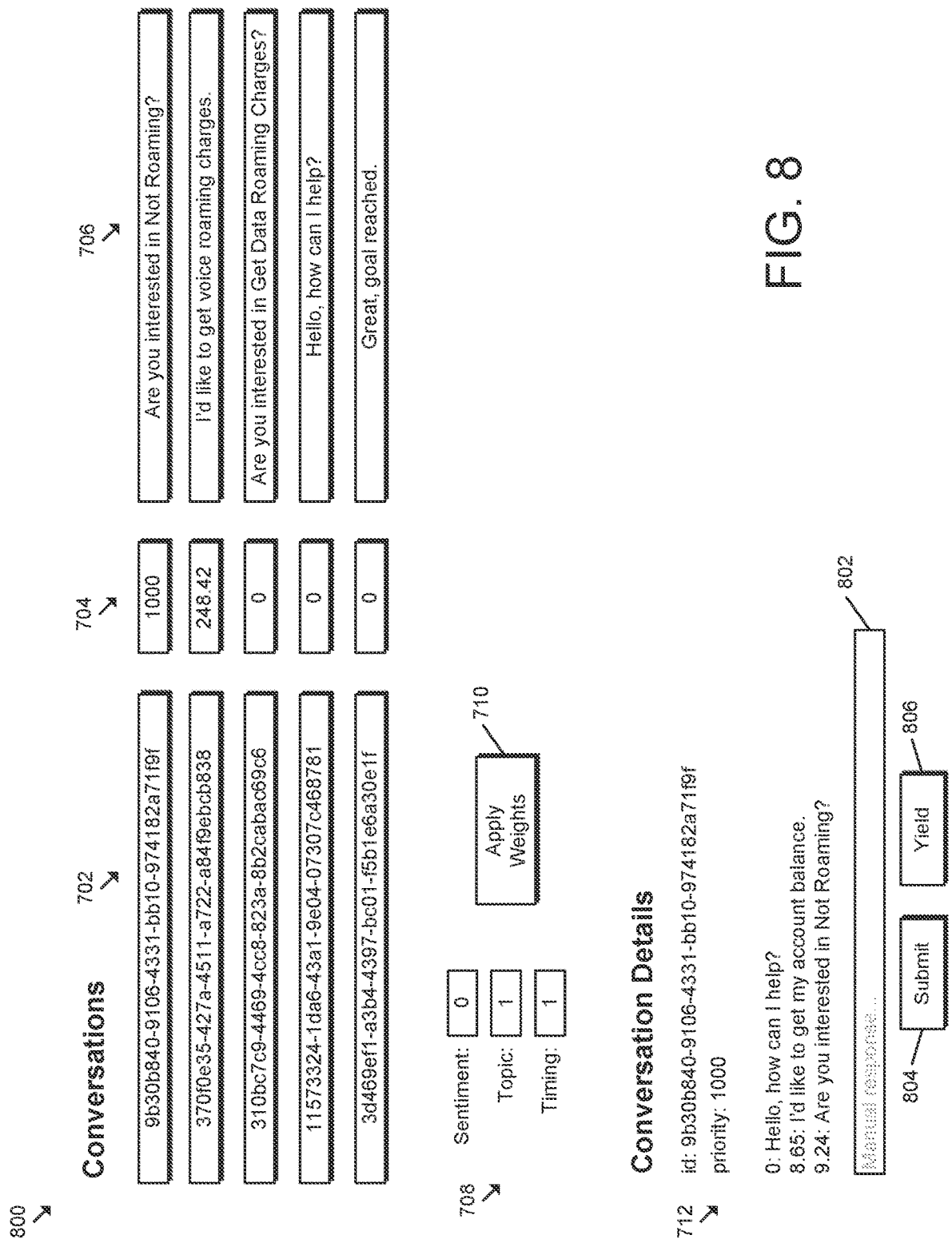

As indicated above, in some embodiments, the priority scores described above may be displayed to the human agent via an interface similar to the interface 700 of FIGS. 7-8. As shown in FIG. 7, the interface 700 includes a set of conversations, each of which includes a conversation identifier 702, a priority score 704, and the last message 706 from the conversation. The interface 700 further depicts the relevant metrics 708 (sentiment, topic, and timing in this embodiment) and the corresponding weights, and an "Apply Weights" button 710 provides the agent with the ability to adjust the particular weights for the metrics. In other embodiments, the human agent is unable to adjust such weights. The interface 700 allows the human agent to click on a particular conversation 702 to show the relevant conversation details 712 for that particular conversation 702. In the illustrative embodiment, the conversation details 712 for the first and highest priority conversation are depicted. The illustrative conversation details 712 include the relevant conversation identifier 702, the relevant priority score 704, and recent dialogue from that conversation with relevant time stamps. In the illustrative embodiment, the interface 700 includes a "Take Over Session" button 714 that allows the human agent to transfer control of the selected conversation from the chat bot 114 to the human agent. Accordingly, if that button 714 is selected, the interface 700 is modified to allow the human agent to provide text entry via a dialog 802, submit the entered text via a "Submit" button 804, and/or yield control of the conversation back to the chat bot 114 via a "Yield" button 806 as shown in FIG. 8.

What is claimed is:

1. A method of dynamic prioritization of collaboration between human and virtual agents, the method comprising:
generating a priority score for a conversation between a human user and a chat bot, wherein the priority score is based on at least a first metric associated with a real-time sentiment of the human user and a second metric associated with a real-time response wait time of the human user in the conversation, wherein the second metric is calculated as a message rate of the conversation multiplied by a current wait time of the human user in the conversation;
providing the priority score to a human agent via an interface for monitoring the priority score;
transferring control of the conversation from the chat bot to the human agent based on an interaction of the human agent with the interface; and
yielding control of the conversation from the human agent back to the chat bot in response to another interaction of the human agent with the interface.

2. The method of claim 1, wherein the priority score is a weighted sum of at least the first metric and the second metric.

3. The method of claim 2, wherein the first metric is a function of the real-time sentiment of the human user, wherein the real-time sentiment of the human user has an output value between a negative scalar indicative of a maximum negative sentiment and a positive scalar indicative of a maximum positive sentiment; and
wherein the first metric is calculated according to $f_{sen}(C)=\max\{0, -sen(C)\}$, wherein $f_{sen}(C)$ is the first metric, sen(C) is the real-time sentiment of the human user, and C is the conversation.

4. The method of claim 2, wherein the first metric is a function of the real-time sentiment of the human user, wherein the real-time sentiment of the human user has an output value between a negative scalar indicative of a maximum negative sentiment and a positive scalar indicative of a maximum positive sentiment; and
wherein the first metric is calculated according to $f_{sen}(C)=\max\{0, sen(C)\}$, wherein $f_{sen}(C)$ is the first metric, sen(C) is the real-time sentiment of the human user, and C is the conversation.

5. The method of claim 2, wherein the first metric is a function of the real-time sentiment of the human user, wherein the real-time sentiment of the human user has an output value between a negative scalar indicative of a maximum negative sentiment and a positive scalar indicative of a maximum positive sentiment; and
wherein the first metric is calculated according to $f_{sen}(C)=|sen(C)|$, wherein $f_{sen}(C)$ is the first metric, sen(C) is the real-time sentiment of the human user, and C is the conversation.

6. The method of claim 1, wherein the priority score is further based on a topic of the conversation; and
wherein the priority score is a weighted sum of the first metric, the second metric, and a third metric associated with the topic of the conversation.

7. The method of claim 1, further comprising performing bot-driven interaction pacing to the conversation by providing filler content by the chat bot based on the priority score.

8. The method of claim 1, wherein generating the priority score for the conversation comprises generating the priority score based on a sequence of time-stamped messages that constitute the conversation.

9. The method of claim 1, wherein the priority score is based on a plurality of weighted metrics; and
wherein one or more weights of the plurality of weighted metrics is adjustable by the human agent.

10. A system for dynamic prioritization of collaboration between human and virtual agents, the system comprising:
at least one processor; and
at least one memory comprising a plurality of instructions stored thereon that, in response to execution by the at least one processor, causes the system to:
generate a priority score for a conversation between a human user and a chat bot, wherein the priority score is based on at least a first metric associated with a real-time sentiment of the human user and a second metric associated with a real-time response wait time of the human user in the conversation, wherein the second metric is calculated as a message rate of the conversation multiplied by a current wait time of the human user in the conversation;
provide the priority score to a human agent via an interface for monitoring the priority score;

transfer control of the conversation from the chat bot to the human agent based on an interaction of the human agent with the interface; and yield control of the conversation from the human agent back to the chat bot in response to another interaction of the human agent with the interface.

11. The system of claim 10, wherein the priority score is a weighted sum of at least the first metric and the second metric.

12. The system of claim 11, wherein the first metric numerically prioritizes one of negative real-time sentiment of the human user, positive real-time sentiment of the human user, or extreme real-time sentiment of the human user.

13. The system of claim 10, wherein the priority score is further based on a topic of the conversation; and wherein the priority score is a weighted sum of the first metric, the second metric, and a third metric associated with the topic of the conversation.

14. The system of claim 10, wherein the plurality of instructions further causes the system to perform bot-driven interaction pacing to the conversation by providing filler content by the chat bot based on the priority score.

15. The system of claim 10, wherein the plurality of instructions further causes the system to provide a plurality of priority scores for corresponding conversations between human users and chat bots to the human agent via the interface for monitoring the priority scores.

16. The system of claim 10, wherein the priority score is a based on a plurality of weighted metrics; and wherein one or more weights of the plurality of weighted metrics is adjustable by the human agent.

17. A method of dynamic prioritization of collaboration between human and virtual agents, the method comprising:

generating a priority score for a conversation between a human user and a chat bot as a weighted sum of at least a first metric associated with a real-time sentiment of the human user, a second metric associated with a real-time response wait time of the human user in the conversation, wherein the second metric is calculated as a message rate of the conversation multiplied by a current wait time of the human user in the conversation, and a third metric associated with a topic of the conversation;

providing the priority score to a human agent via an interface for monitoring the priority score;

transferring control of the conversation from the chat bot to the human agent based on an interaction of the human agent with the interface; and yielding control of the conversation from the human agent back to the chat bot in response to another interaction of the human agent with the interface.

18. The method of claim 1, wherein the message rate is a number of messages of the conversation per unit of time.

* * * * *